Patented Aug. 11, 1931

1,818,542

UNITED STATES PATENT OFFICE

GEORGE HOLLAND ELLIS, OF SPONDON, NEAR DERBY, ENGLAND, ASSIGNOR TO CELANESE CORPORATION OF AMERICA, A CORPORATION OF DELAWARE

DYEING OR COLORING OF PRODUCTS MADE WITH CELLULOSE ACETATE

No Drawing. Original application filed September 25, 1923, Serial No. 664,781, and in Great Britain January 27, 1923. Divided and this application filed December 27, 1926. Serial No. 157,413.

In my Patent 1,618,413, granted February 22, 1927, there is described a process for dyeing, coloring, printing or stencilling yarns, threads, filaments, fabrics, films or other materials consisting of cellulose acetate alone or associated with other fibres or materials.

In the specification of my said U. S. patent, I have proposed to employ for the dyeing, printing or stencilling of such goods or materials any organic compounds or coloring matters which are favourably constituted or have an affinity for cellulose acetate or are capable of dyeing or coloring the same, but which are insoluble, practically insoluble or of relatively low solubility in water, all of which are hereinafter included in the expression "relatively water-insoluble", by employing them in the form of dispersed, i. e. soluble or more soluble modifications obtained by pretreating them with one or more bodies having oily or fatty characteristics containing salt-forming groups capable of forming soluble salts with alkalies or ammonia, for example the sulpho group or the carboxyl group or both sulpho and carboxyl groups, or salts of such bodies such for instance as their sodium or other alkali salts or ammonium salts. Such bodies and their salts are hereinafter, as in the said patent, included in the term body of oily or fatty characteristics. In particular according to my said U. S. patent one can employ dispersed modifications obtained by treating the said organic compounds or coloring matters with sulphoricinoleic or other sulphonated fatty acids or salts thereof such as the alkali or ammonium salts. Other bodies of oily or fatty characteristics instanced in my said U. S. patent are for example oleic, stearic or palmitic acid and salts thereof such as the alkali and ammonium salts.

The specification of my said U. S. Patent 1,618,413 gives many examples of classes of organic compounds or coloring matters insoluble or of relatively low solubility in water which may be applied in dispersed modifications as referred to. Amongst these are indicated unsulphonated or other insoluble or relatively insoluble compounds or coloring matters of the "azo" class; unreduced coloring matters of the substituted quinone-monoimide series generally comprised within the term Indophenols; coloring matters or compounds of the following classes, usually containing no sulpho groups: — diphenylmethane, triphenylmethane, triarylmethane, oxazine, azine, diazine, thiazine, unreduced indigoid; basic derivatives of the anthraquinone series; such as aminoanthraquinones, aminohydroxyanthraquinones or their derivatives such as 1-hydroxy-4-paratolylamino-anthraquinone, 1-paratolylamino-4-methylamino-anthraquinone and so forth; or (for employment according to the azoic or development method) simple amino bases.

It is further stated in my said U. S. patent that the dispersed modifications of the organic compounds or coloring matters or of the simple amino bases may be employed for the dyeing of "mixed" materials containing cellulose acetate associated with cotton, silk, wool or other threads or fibres. Especially it is stated that the dispersed modifications of favourably constituted organic compounds or coloring matters may be applied to the dyeing of goods consisting of cellulose acetate and one or more of the fibres: cotton, wool, silk, artificial silks of the cellulose type, having no affinity or less affinity than the cellulose acetate for said dispersed compounds or coloring matters, so that the cellulose acetate is selectively or preferentially colored thereby, the other fibre, or one or more of the other fibres, being dyed or colored to similar or differential shades relatively to the cellulose acetate by other coloring matters or compounds or the employment of such other coloring matters or compounds being omitted.

It is further stated in my said U. S. patent that in dyeing materials consisting of or containing cellulose acetate with the dispersed modifications of any of the insoluble or relatively low soluble organic compounds or coloring matters having an affinity for cellulose acetate, other dyes may or may not be employed in combination or association with them in the same operation, or in separate operations, for the production of compound shades on the cellulose acetate.

For further particulars and examples of organic compounds or coloring matters insoluble or of relatively low solubility in water, which may be applied in dispersed modifications as aforesaid for dyeing goods consisting of or containing cellulose acetate, and as to the manner in which they may be applied, I refer to my said U. S. Patent 1,618,414.

Now U. S. Patent 1,618,414, of which the present is a divisional application, likewise concerns the dyeing of goods such as referred to consisting of or containing cellulose acetate with the aid of dispersed, i. e. soluble or more soluble, modifications of organic compounds or coloring matters having an affinity for or capable of coloring cellulose acetate but insoluble, practically insoluble or of relatively low solubility in water, all of which are herein included in the expression "relatively water-insoluble". The said U. S. Patent 1,618,414 states that in any of the cases referred to in the specification of said Patent 1,618,413 one may employ wholly or partly instead of the dispersing agents therein referred to, other organic bodies as dispersing agents for the organic compounds or coloring matters or simple amino bases to be applied to the materials consisting of or containing cellulose acetate.

Such other organic dispersing agents comprise a wide range of non-oleaginous compounds, being organic derivatives containing in their structure one or more salt forming groups such as the sulphonic, carboxyl, or hydroxyl groups, (whether the compound contains only one kind of these groups or different kinds of these groups at the same time) and salts of such bodies; for example one may employ phenols, sulphonic acids, carboxylic acids, phenol-sulphonic acids or other derivatives of the benzene, napthalene or anthracene series, containing one or more of any of these groups; or derivatives of other cylic hydrocarbons, saturated or nonsaturated, containing one or more of the above mentioned groups, such for example as the napthenic acids, napthene sulphonic acids or other carboxylic or sulphonic acids of the cyclo paraffins or one may employ the sodium or other salts of one or more of any of the above mentioned derivatives. All such organic salt forming derivatives as aforesaid and their salts are hereinafter included in the expression carbocyclic dispersing agent.

Now the present divisional application has for its object to claim specifically the employment in any of the processes of U. S. Patent 1,618,414 of the unreduced coloring matters or compounds of the indigoid series.

The dispersed modifications thereof may be made by merely grinding or mixing the dispersing agent or mixtures of dispersing agents, with the suitable coloring matter, organic compound or simple amino base, etc., or by heating under ordinary atmospheric pressure or under increased or reduced pressure in the presence or absence of water. The dispersed modifications of the coloring matter or compound or mixtures of same may then be utilized for any of the purposes described in the specification of my said Patent 1,618,413 for example:—for the dyeing of acetyl cellulose, by simply dissolving the soluble modification in hot or cold water, filtering into the dyebath (which may be acid, neutral or alkaline) and conducting the dyeing as usual; for printing or stencilling acetyl cellulose, by thickening, as may be required, a solution of the dispersed modification, or mixture of such, by the use of substances such as starches, gums, flour and the like, and applying in the usual manner, followed by such after-treatment as may be requisite; for the dyeing or printing of mixed goods containing acetyl cellulose, either in uniform shades or in contrasting colors or leaving the material other than the acetyl cellulose uncolored.

It is further understood that mixtures containing different carbocyclic dispersing agents of the said Patent 1,618,414 may be employed, or mixtures of one or more of them with one or more of the solubilizing agents of my said Patent 1,618,413, and that the expression "a medium comprising a carbocyclic dispersing agent" in the claims is to be read as including any such mixtures as well as the individual carbocyclic dispersing agents themselves.

The term dyeing in the claims includes dyeing, printing and stencilling.

The term "compound of the naphthenic acid class" in the claims comprises the naphthenic acids and naphthene sulphonic acids and their sodium or other salts.

What I claim and desire to secure by Letters Patent is:—

1. Process for the dyeing of yarns, fabrics and other products containing cellulose acetate, comprising applying thereto an aqueous dispersion of relatively water-insoluble unreduced indigoid coloring matter, the said dispersion being prepared by a method involving pretreating the coloring matter with a carbocyclic dispersing agent.

2. In and for the dyeing of yarns, fabrics and other products comprising cellulose acetate, the employment of relatively water-insoluble unreduced coloring matters of the indigoid series, said coloring matters being employed in the form of dispersed modifications obtained by pretreating them with a medium comprising a carbocyclic dispersing agent which is a compound of the class consisting of naphthenic acids and naphthene sulphonic acids and their salts.

3. In and for the dyeing of yarns, fabrics and other products comprising cellulose acetate, the employment of relatively water-insoluble unreduced coloring matters of the indigoid series, said coloring matters being employed in the form of dispersed modifications obtained by pretreating them with a medium comprising a carbocyclic dispersing agent which is a naphthenic acid salt.

4. In and for the dyeing of yarns, fabrics and other products comprising cellulose acetate, the employment of relatively water-insoluble unreduced coloring matters of the indigoid series, said coloring matters being employed in the form of dispersed modifications obtained by pretreating them with a medium comprising a naphthenic acid sodium salt.

5. Process for the dyeing of yarns, fabrics and other products containing cellulose acetate, comprising applying thereto an aqueous dispersion of relatively water-insoluble unreduced indigoid coloring matter, the said dispersion being prepared by a method involving pretreating the coloring matter with a carbocyclic dispersing agent and a body of oily or fatty characteristics.

6. In and for the dyeing of yarns, fabrics and other products comprising cellulose acetate, the employment of relatively water-insoluble unreduced coloring matters of the indigoid series, said coloring matters being employed in the form of dispersed modifications obtained by pretreating them with a mixture comprising a carbocyclic dispersing agent which is a compound of the class consisting of naphthenic acids and naphthene sulphonic acids and their salts and a higher fatty acid compound.

7. In and for the dyeing of yarns, fabrics and other products comprising cellulose acetate, the employment of relatively water-insoluble unreduced coloring matters of the indigoid series, said coloring matters being employed in the form of dispersed modifications obtained by pretreating them with a mixture comprising a carbocyclic dispersing agent which is a compound of the class consisting of naphthenic acids and naphthene sulphonic acids and their salts and a sulphonated ricinoleic acid compound.

8. In and for the dyeing of yarns, fabrics and other products comprising cellulose acetate, the employment of relatively water-insoluble unreduced coloring matters of the indigoid series, said coloring matters being employed in the form of dispersed modifications obtained by pretreating them with a mixture comprising a carbocyclic dispersing agent which is a naphthenic acid salt and sodium salt of sulphoricinoleic acid.

In testimony whereof I have hereunto subscribed my name.

GEORGE HOLLAND ELLIS.